Patented Oct. 4, 1932

1,881,074

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

4-AMINO-2-HALO-DIPHENYLETHERS AND PROCESS OF PREPARING SAME

No Drawing. Application filed February 13, 1931. Serial No. 515,645.

The present invention concerns new amines suitable for use in the preparation of azo dyes, namely, 4-amino-2-halo-diphenylethers, particularly 4-amino-2-chloro-diphenylether.

In a co-pending application, Serial No. 513,056, filed February 2, 1931, I have disclosed coupling diazotized 4-amino-2-halo-diphenylethers with hydroxynaphthoic arylides to form direct-developed azo dyes. In another co-pending application, Serial No. 513,055, filed February 2, 1931, I have disclosed condensing 4-amino-2-halo-diphenylethers with hydroxynaphthoic acid to form arylides, which latter may then be coupled with diazo components to form azo dyes of direct-developed type in the usual manner. In the present application, I now am describing and claiming the aforesaid new 4-amino-2-halo-diphenylethers as well as methods for the preparation thereof.

My invention, then, consists of the aforesaid new compositions of matter, the following description setting forth methods of preparing the same and giving certain physical properties whereby such compounds may be characterized and identified.

The preparation of 4-amino-2-chloro-diphenylether is described below to illustrate my present invention. 1.2-dichlorobenzene, which is accumulated in considerable amount as a by-product in the industrial manufacture of 1.4-dichlorobenzene, is nitrated in any suitable way to form 1.2-dichloro-4-nitrobenzene, for instance, by treating an acetic acid solution of 1.2-dichlorobenzene with 6 to 8 parts of concentrated sulfuric acid and with nitric acid, the temperature being maintained below about 40° to 50° C. The product, which may be obtained in approximately 90 per cent yield, may be recrystallized from alcohol for the purpose of purification thereof. The so prepared 1.2-dichloro-4-nitrobenzene then is reacted in any suitable way with an alkali-metal phenate to form 4-nitro-2-chloro-diphenylether, e. g. by refluxing the first-named compound with an equimolecular amount of the phenate in the presence of excess phenol as a diluent, thereby forming 4-nitro-2-chloro-diphenylether and alkali-metal chloride, which ether may be separated from the reaction mixture. The so obtained 4-nitro-2-chloro-diphenylether is then reduced in any suitable way to form the corresponding amine. For instance, said nitro compound may be reduced with metallic iron and a small amount of an acid such as hydrochloric or acetic acid, in the presence of water, at a temperature of about 100° C. The resulting liquor is filtered to remove metallic iron therefrom, the two layers separated, the oily layer then being separated from the aqueous layer and purified by fractionally distilling the same under reduced pressure.

The following example describes one way of preparing 4-amino-2-chloro-diphenylether.

Example

In a suitable reactor, a mixture of 2 moles of phenol and 1 mole of concentrated aqueous potassium hydroxide solution was heated under a reduced pressure, thereby distilling out excess phenol together with water formed in the reaction, substantially anhydrous potassium phenate remaining therein. To the residue there was added 1 mole of 1.2-dichloro-4-nitrobenzene and the mixture further heated with stirring for 3 hours at 180° to 200° C. The reaction mixture was then cooled, separated from potassium chloride by filtration thereof, and then distilled, together with benzene washings from said potassium chloride, thereby obtaining 2-chloro-4-nitro-diphenylether (boiling point about 180° at 5 mm.) in approximately an 85 per cent yield.

The above prepared 2-chloro-4-nitro-diphenylether was reduced to the corresponding amino compound by agitating the same with water and iron in the presence of about 1/40 molecular equivalent of hydrochloric acid. The reaction mixture was extracted with benzene and the so obtained benzene solution of said amine then shaken with an excess of concentrated aqueous hydrochloric acid (sp. gr. 1.19) whereupon the hydrochloride of 4-amino-2-chloro-diphenylether separated therefrom in the form of crystals. The free amine, prepared from the hydrochloride in the usual way, was purified by distillation (boiling point equals 180° to 182° at 5 mm.) (melting point equals about 29° to 30° C.). The hydrochloride crystals thereof are soluble in water, but very difficultly soluble in hydrochloric acid, and have a melting point of 195° to 199° C.

By condensation of 4-amino-2-chloro-diphenylether with 2.3-hydroxynaphthoic acid with the aid of phosphorus trichloride and in the presence of toluene in the usual way, there was obtained 4-(2'.3'-hydroxynaphthoylamino)-2-chloro-diphenylether (M. p. 210° to 212° C.) as a solid intermixed with a liquid medium wherefrom said arylide was separated and purified in the usual manner.

Other amines than the one described in the example can be prepared similarly, e. g. 4-amino-2-bromo-diphenylether or 4-amino-2-halo-diphenylethers wherein the diphenyl nucleus may be substituted by other groups such as halo, alkyl, alkoxy, nitro, etc.

Other modes of applying the principle of my invention may be employed instead of those explained, change being made as regards the steps herein disclosed, provided the details stated by any of the following claims or the equivalent thereof be employed.

I therefore particularly point out and distinctly claim as my invention:—

1. A 4-amino-2-halo-diphenylether, wherein the diphenyl nucleus may bear substituents selected from the group consisting of halo, alkyl, alkoxy, and nitro substituents.

2. A 4-amino-2-halo-diphenylether.

3. 4-amino-2-chloro-diphenylether of melting point 29° to 30° C., and of boiling point 180° to 182° C. at 5 mm. absolute pressure.

4. The hydrochloride salt of 4-amino-2-chloro-diphenylether.

5. A process of making a 4-amino-2-halo-diphenylether which comprises reducing a 2-halo-4-nitro-diphenylether.

6. A process of making 4-amino-2-chloro-diphenylether which comprises reducing 2-chloro-4-nitro-diphenylether with iron and water in the presence of a relatively small amount of hydrochloric acid.

7. A process of making a 4-amino-2-halo-diphenylether which comprises reacting 1.2-dihalo-4-nitrobenzene with an alkali-metal phenate to form 2-halo-4-nitro-diphenylether and reducing the latter to the corresponding amino compound.

8. A process of making 4-amino-2-chloro-diphenylether which comprises reacting 1.2-dichloro-4-nitrobenzene with an alkali-metal phenate to form 2-chloro-4-nitro-diphenylether and reducing the latter with iron and water in the presence of an acid from the group consisting of hydrochloric and acetic acids.

9. A process of making 4-amino-2-halo-diphenylether which comprises reacting 1.2-dihalo-4-nitrobenzene with an alkali-metal phenate in the presence of excess phenol as diluent to form 2-halo-4-nitro-diphenylether and reducing the latter.

10. A process of making 4-amino-2-chloro-diphenylether which comprises reacting 1.2-dichloro-4-nitrobenzene with substantially anhydrous potassium phenate in the presence of excess phenol as diluent to form 2-chloro-4-nitro-diphenylether and reducing the latter with iron and water in the presence of hydrochloric acid to form the corresponding amine.

Signed by me this 7th day of February, 1931.

ERNEST F. GRETHER.